Figure 1:
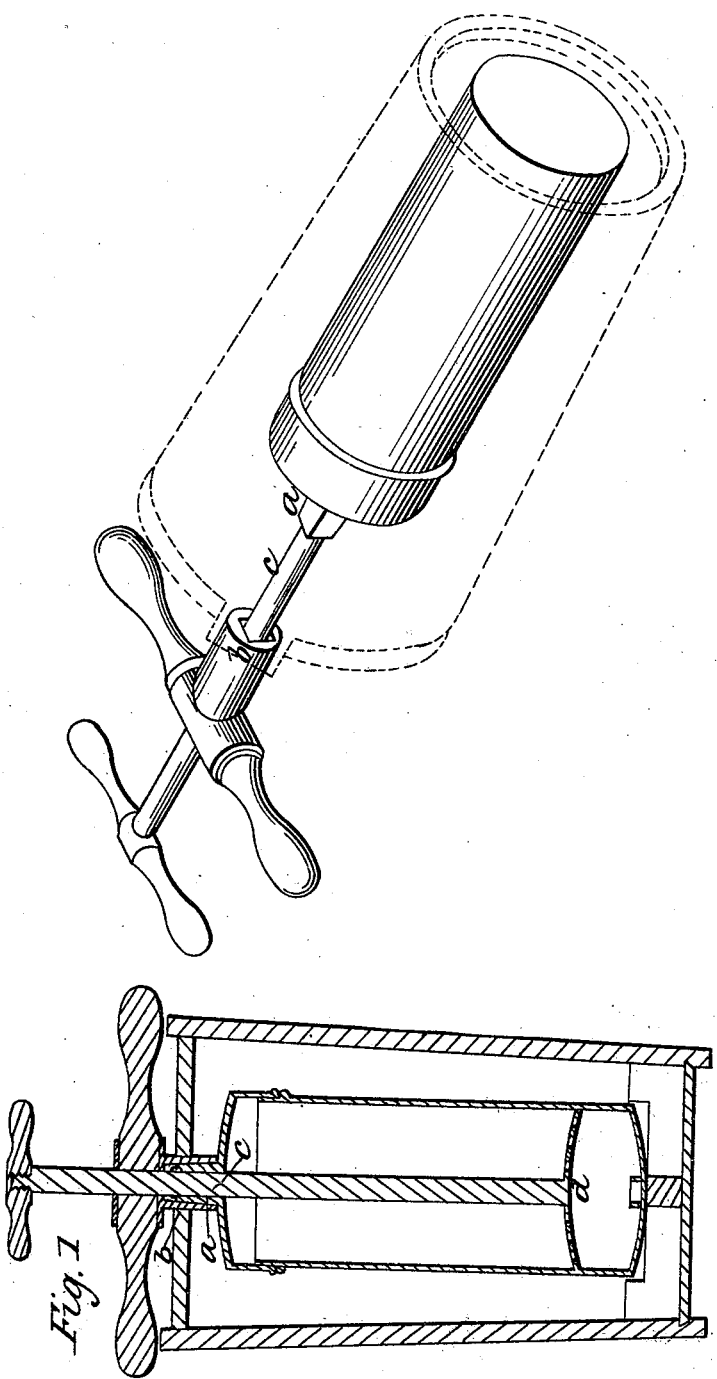

W. C. YOUNG.
Ice Cream Freezer.

No. 5,601.  Patented May 30, 1848.

UNITED STATES PATENT OFFICE.

W. G. YOUNG, OF BALTIMORE, MARYLAND, ASSIGNOR TO A. H. REIP.

IMPROVEMENT IN ICE-CREAM FREEZERS.

Specification forming part of Letters Patent No. 5,601, dated May 30, 1848.

*To all whom it may concern:*

Be it known that I, WILLIAM G. YOUNG, of the city and county of Baltimore, and State of Maryland, have invented new and useful Improvements in Ice-Cream Freezers; and I do hereby declare that the following is a full, clear, and exact description of the principle or character which distinguishes them from all other things before known, and of the manner of making, constructing, and using the same, reference being had to the accompanying drawings, making part of this specification, in which—

Figure 1 is a vertical section through the apparatus. Fig. 2 is a perspective view of the freezer, the tub being shown in red lines and the handles of the freezer and beater being raised.

The same letters indicate like parts in both the figures.

Many devices have been resorted to for expeditiously freezing ice-cream, but all have been found to be defective. The best now in use is that known as "Johnston's," which is, like the ordinary freezer, with a revolving shaft inside it, on which are two curved wings that move round and cause the cream to revolve in the freezer and be thrown to the outside. I find that the operation is greatly facilitated by causing the freezer itself to move rapidly as well as the cream inside. To effect this I construct the freezer with the cover firmly attached, so as not to turn on it, and from the center of the top I project upward a square boss, $a$, onto which, when the cover of the tub is on, I put a key, $b$, through a hole in said cover of the tub, by which the freezer is turned. This key is weighted at each end of the cross-handle, which is made of cast-iron, so as to act as a fly to facilitate the turning of the freezer, which pivots on a cross-bar in the tub. Through the center of the boss $a$, above named, and the key $b$, there is a hole in which a piston-rod, $c$, works up and down. On the lower end of this rod there is a beater, $d$, full of holes, for the purpose of moving the cream inside, while by turning the freezer in the ice the ice is brought into close contact with it, and the cream is so put in motion as to bring all of it rapidly into contact with the cold sides of the freezer, which cannot be done by stirring alone, while, by the aid of the beater, the cream is lightened and the air allowed to come between the particles as effectually as by any other mode of stirring, and by their united operation the cream is more perfectly and speedily frozen and well beaten than by either of the modes now used.

What I claim as my invention, and desire to secure by Letters Patent, is—

The combination of the revolving freezer and beater, constructed and operating substantially in the manner and for the purpose set forth.

WILLIAM G. YOUNG.

Witnesses:
JOHN L. SPANGLER,
JOHN DICKSON.